(12) United States Patent
Lacome D'Estalenx

(10) Patent No.: US 6,889,252 B2
(45) Date of Patent: May 3, 2005

(54) METHOD AND SYSTEM FOR USING A SELECTED PERIPHERAL OF A NETWORK USING A SERVER AS A RE-ROUTER

(75) Inventor: Jean-François Lacome D'Estalenx, Paris (FR)

(73) Assignee: JetCAPS International Business Strategy SAS, Paris (FR)

( * ) Notice: Subject to any disclaimer, the term of this patent is extended or adjusted under 35 U.S.C. 154(b) by 543 days.

(21) Appl. No.: 10/012,879

(22) Filed: Oct. 22, 2001

(65) Prior Publication Data

US 2003/0078998 A1 Apr. 24, 2003

(51) Int. Cl.[7] .............................................. G06F 15/177
(52) U.S. Cl. ...................... 709/220; 709/203; 709/208; 709/217; 709/223; 710/8; 710/10
(58) Field of Search ................................. 709/200–203, 709/208–209, 217–220, 227–229, 245–246; 710/8–19, 223–224

(56) References Cited

U.S. PATENT DOCUMENTS

| | | | | |
|---|---|---|---|---|
| 5,550,976 A | * | 8/1996 | Henderson et al. ......... | 709/220 |
| 6,003,065 A | * | 12/1999 | Yan et al. ................... | 709/201 |
| 6,289,371 B1 | * | 9/2001 | Kumpf et al. ............... | 709/203 |
| 6,292,827 B1 | * | 9/2001 | Raz ............................. | 709/217 |
| 6,292,828 B1 | * | 9/2001 | Williams ..................... | 709/224 |
| 6,327,613 B1 | * | 12/2001 | Goshey et al. .............. | 709/208 |
| 6,330,611 B1 | * | 12/2001 | Itoh et al. ................... | 709/229 |
| 6,473,794 B1 | * | 10/2002 | Guheen et al. ............. | 709/223 |
| 6,615,166 B1 | * | 9/2003 | Guheen et al. ............. | 709/220 |
| 6,662,241 B1 | * | 12/2003 | Bauer et al. ................. | 710/8 |
| 6,725,260 B1 | * | 4/2004 | Philyaw ...................... | 709/220 |
| 6,792,452 B1 | * | 9/2004 | Philyaw ...................... | 709/217 |

* cited by examiner

Primary Examiner—Bharat Barot
(74) Attorney, Agent, or Firm—Leydig, Voit & Mayer, Ltd.

(57) ABSTRACT

Disclosed is a network peripheral access method. A device on a network registers with a server that peripheral access requests of a specific type be directed to a specific peripheral. When the device creates a request of the specified type, rather than sending the request directly to the peripheral, the device sends the request to the server. The server receives the request, associates the request with the peripheral registered for that type of request, and sends the request to the registered peripheral. In an alternate embodiment, the device sends an abbreviated request to the server, the server responds with an access identifier (e.g., a network address) of the registered peripheral, and the device sends the request directly to the registered peripheral. The presence of the server decreases the amount of peripheral-specific configuration information kept on the requesting device.

39 Claims, 1 Drawing Sheet

METHOD AND SYSTEM FOR USING A SELECTED PERIPHERAL OF A NETWORK USING A SERVER AS A RE-ROUTER

FIELD OF THE INVENTION

The invention relates to the use of peripherals of a network.

In the present text, "peripheral" means any piece of hardware and/or software which can receive data from, and/or emit data to, a computer.

And more precisely, the invention relates to a method for allowing a user having a terminal connected to a network, to select a given peripheral of the network (i.e. a given peripheral connected to the network), in order to direct to the peripheral an output request issued by the computer and to have the peripheral performing a graphical edition of data corresponding to the output request.

The invention also concerns a system for implementing such a method.

A peripheral as mentioned above must be able to perform a graphical edition of data it can be a printer, but also a facsimile, a computer screen, a light projector, etc.

BACKGROUND OF THE INVENTION

A first trend in the field of computer use is that computers and peripherals are widely used in network architectures. Such network architectures are often provided by private or public organizations to their members, to allow shared access to a number of common resources.

These networks comprise at least one server to which several terminals and/or peripherals can be connected.

A second trend concerns portable laptop computers. Such laptop computers have become of common use. They allow increased mobility of the users of a network: for example, in the case of a network spread over several physical premises, a user can connect his laptop computer to the network while being physically located in any one of the premises covered by the network.

And instead of a laptop computer, the user can connect to the network with any portable (or even non-portable) terminal comprising an operating system and connection means to the network.

Such terminals can be any terminal (computer, but also electronic notebook or Personal Digital Assistant, etc . . . ).

In the present specification, the generic term of "terminal" will thus refer to any device as mentioned above. Preferably, the terminal is portable (even though the invention could be embodied with a fixed terminal).

In this context of network architecture and increased mobility, it is often desirable for a user to be able to connect his terminal to any given one of several peripherals of a network, for the purpose of transmitting to the peripheral an electronic output of data, which the user wishes to graphically edit on the desired peripheral.

Such graphical edition can result in the printing of a document if the peripheral has printing means (peripheral is e.g. a printer), or in any other form of graphical edition (edition of the output on the display of the peripheral, projection on a screen of the graphical image of the file, etc . . . ).

To enable the terminal of the user to transmit such output to the selected peripheral, and to enable the peripheral to perform the graphical edition, the terminal must be configured in accordance to the specific parameters of the peripheral.

With known methods and devices, this requires the loading, in the portable computer, of an adapted driver containing said specific parameters of the peripheral.

It is reminded that a driver is a piece of hardware and/or software which builds a link between a terminal and a peripheral, so as to allow files and/or data to be exchanged between the terminal and the peripheral.

Thus, if a use e.g. attending a meeting wishes to graphically edit a document stored in his terminal on a given peripheral (e.g. a printer located in the room), the terminal has to be configured in accordance to the specific parameters of this particular peripheral.

In the above example, the meeting room might well not correspond to the usual physical environment of the user.

And typically, the terminal of the user is not always configured in accordance to the specific parameters of the desired peripheral.

In such a case, to actually perform the graphical edition, the user has to load in his terminal the driver corresponding to the desired peripheral.

To allow the user to output data from his terminal to any peripheral of the network, a first possible solution would then be to load all the corresponding peripheral drivers in the terminal memory.

But this would rapidly become burdensome and complex to manage (the fleet of peripherals being not static, the drivers should therefore be regularly updated) especially in the case of a large network having a large number of possible peripheral) for a terminal connected to the network.

Furthermore, this would lead to an unjustified load in the terminal memory.

Another solution could then be to load a driver only when the corresponding peripheral is needed.

Yet, it is sometimes difficult to find the right driver at the required moment, especially in "real time" (during a meeting for example.)

Moreover, the loading of the driver is in any case a time consuming and burdensome operation.

Thus, it appears that there is a need for a solution allowing a user to select any desired peripheral of a network, and output data to this peripheral from the user's terminal.

SUMMARY OF THE INVENTION

It is an object of the invention to enable a user having data stored in a terminal to have data output requests to be directed to and executed by a selected peripheral of a network, this being achieved without bearing the above mentioned drawbacks.

It is another object of the invention to fully use the features of some of the state-of-the-art peripherals, in particular of some of the state-of-the-art printers.

Thus, and as will be explained in more details below, it is possible for a user to select any desired peripheral connected to a network, and to output data memorized in his terminal on this selected peripheral without bearing the above mentioned drawbacks associated to the known techniques.

And as will be explained below, the implementation of the invention only requires a minimum installation of additional software on the user's terminal (even none for some embodiments of the invention).

DETAILED DESCRIPTION OF THE INVENTION

Figure 1:
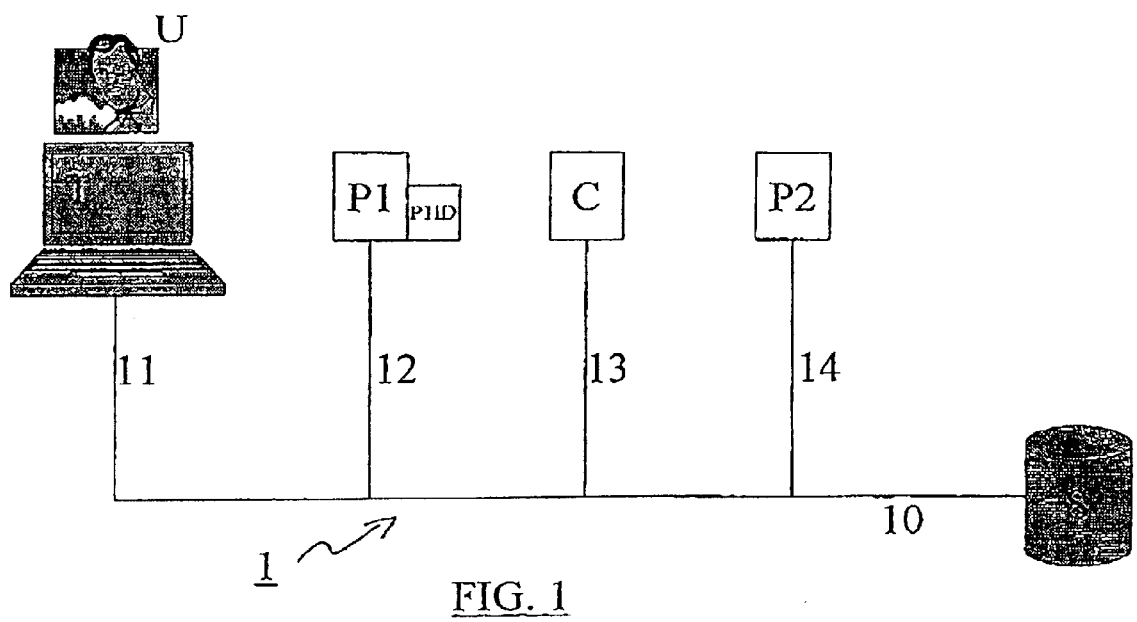
FIG. 1 is a schematic representation of a network for implementing the invention, network to which a number of peripherals and/or computers, and at least a user terminal and a server are connected.

A schematic representation of a network 1—for instance a network of a public or private organization—is shown in FIG. 1.

The network 1 comprises a main branch 10 connecting a server S to different elements through side branches—referred by numbers from 11 to 14. The server S has memory means associated to it. The server S operates the network 1.

These elements include a terminal T connected to the server S through the side branch 11 and the main branch 10.

The other elements include:
two peripherals P1, P2 which are connected to the server S through the respective side branches 12 and 14 and the main branch 10 of the network 1,
as well as an additional terminal—which can be a computer C connected to the server S through the side branch 13 and the main branch 10.

The network 1 may comprise private and/or public parts (including parts of the internet.) All the elements of the network 1 can be spatially gathered within a same building, or scattered across different premises.

The network can comprise a large number of branches, as well as a large number of connected peripherals (the simplified example of FIG. 1 showing only two peripherals for clarity).

The specific "shape" of the network is of course not a specific feature of the invention. The very schematic drawing of FIG. 1 is not limitative in that regard.

In FIG. 1, a user U is also represented. The terminal T belongs to the user U, and is personal to him (which means that the user knows a secret code to start a session with the terminal and use it).

Moreover, an information identifying the user can be memorized in a first table of the memory means of the server S, in association with an information identifying the terminal. Thus, the memory means of the server have the information that the user U is associated with the terminal T.

And the terminal T is known from the server S.

According to the invention, the terminal T of the user U is permanently configured to direct its output requests for a graphical edition to the server S.

The server S is thus known by the terminal T as its dedicated peripheral, and none of the respective drivers of peripherals P1 or P2 has to be loaded in the memory of the terminal.

As will appear below, the user U will nevertheless be able to direct output requests from its terminal T to any desired peripheral of the network (i.e., in the present example to either P1 or P2), and this without reconfiguraton of his terminal or loading in the terminal of a specific driver for the desired peripheral.

The server S may be integrated within a printer so as to be at the same time a server and a printer, or not. Some state of the art printers indeed are now configured to be at the same time a server S. Informations about such printers can be found e.g. at http://www.hp.ccm/products1/embedded/whatischai.html.

The server S can also be integrated into any type of peripheral, in particular a peripheral able to perform a graphical edition It can be e.g. a projector, a copier, or a monitor or TV.

Typically, the server S can be such a state of the art printer, and be the usual office printer of the user.

Starting from a situation where the user U wishes to perform a graphical edition from his terminal to, say, the peripheral P1, it will now be described how the invention allows such graphical edition to be actually performed by P1.

Of course, the following description would also apply whatever peripheral of the network (P2, or any other if available) the user wishes to select to perform his graphical edition.

In the following example, the peripheral P1 is a printer. It could be any other type of peripheral as mentioned above.

As will appear in the present text, the invention can be implemented in two main different modes.

Figure 2:
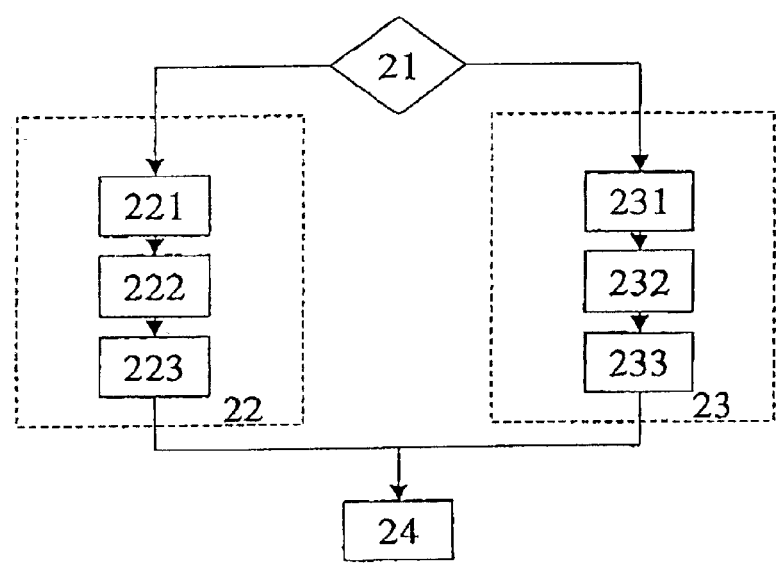
FIG. 2 is a diagram of the main steps performed by the method according to the invention—this diagram containing different alternatives which can be selected by a user to implement the invention.

More specifically, and in reference to FIG. 2, some details will be given on the steps of the method according to the invention, FIG. 2 showing the two main modes which can be chosen by the user to implement the invention.

In 21, the user chooses a selection mode for selecting a desired peripheral which is to execute the output requests that will be generated by the terminal T when the terminal T is connected to the network 1.

Indeed, there are two main selection modes that can be offered to the user, these two selection modes corresponding to the two main modes of the invention.

Description of a First Embodiment

The user can choose to select the peripheral P1 "locally", i.e. through a selection action which is physically directly executed on P1.

In this first mode of selection, the terminal T does not have to be connected to the network at the time of selection of a peripheral.

On the other hand, this first selection mode requires that P be associated with an identification device, as will be explained below.

If in step 22 the user selects this first mode, the sequence 22 of steps 221 to 223 shall be executed.

In 221, the user provides the selected peripheral P1 with identification information relative to the user and/or to the terminal, by a direct input on the identification device associated to P1.

An identification relative to the user can be e.g. a string of characters which is personally associated to the user.

An identification relative to the terminal can be e.g. a serial number, or any number associated to the terminal. It is specified that the "association" between P1 and its identification device means that the identification device is dedicated to P1—or can be selectively dedicated to P1.

The identification device P1ID can be of any type, such as for example:
a keypad for allowing the user to enter one or more identification code(s),
a sensor able to sense a biometry information specific to the user. Such a sensor can be able to characterize a physical feature of the user such as his fingerprints, voice, eye, etc . . .
a card reader for reading the identification information contained in a card personal to the user (card with a microchip which can be read with an electrical contact, or through contactless means such as e.g. a radiowave reader or an infrared reader of the identification device),
an infrared receiver for receiving identification information which have been beamed by the user from a device personal to the user and having an infrared port (such as a portable telephone, a personal digital assistant . . . ), using e.g. the keypad of said personal device, etc . . . any identification means can be used in the identification device.

More generally, the identification device P1ID can comprise any means allowing unambiguous identification of the user and/or of the terminal.

Indeed, the role of P1ID is to receive an identification information of the user and/or the terminal T, and to transmit it to the server S (step 222), together with an information identifying the selected peripheral P1. To do this, P1ID is connected to the network 1, via the peripheral P1 for instance.

The information identifying the peripheral can be, e.g. the network address of the peripheral in network 1. It can be expressed as a URL (Universal Resource Locator), or as a IP (Internet Protocol) address.

As said above, the identification information entered into the identification device is specific to the user, and/or to the terminal.

Indeed, the purpose of the identification step performed in 221 is to update a second table of the memory means of the server S, said second table associating each terminal which is known by the server to one of the peripherals of the network, for the purpose of redirecting output requests from a given terminal to the associated peripheral.

This update operation corresponds to step 223.

If the information provided to the identification device only allows identification of the user, step 223 will comprise the following substeps:

the server S receives the information identifying the user, the server S scans a reference table of its memory means to check that the received information corresponds to a declared user, the server S scans the first table of its memory means to determine which is the terminal associated to the identified user, and retrieves from this first table an information identifying the terminal T, the server S updates the second table of its memory means, associating in this second table the information identifying the terminal T with the peripheral P1.

In the above case (the information provided to the identification device only allows identification of the user) an information identifying the user must be memorized in the above-mentioned first table of the memory means of the server S, in association with an information identifying the terminal.

If the information provided to the identification device allows identification of the terminal (e.g. the user has entered on a keyboard of the identification device of P1 a code associated to the terminal T or has fed into this device a smartcard with information identifying T), step 223 will only comprise the updating by the server S of the second table of its memory means.

The first and second tables can form a single table in the memory means of the server S.

And in the case where the information provided to the identification device directly allows identification of the terminal, the first table is not necessary.

The identification device P1ID can be physically integrated into the peripheral P1 (with a physical input interface accessible to the user for allowing him to enter the identification information). P1 can be e.g. a printer with an integrated identification device.

The identification device P1ID can also be physically separated from the peripheral P1.

In this case, either:

the identification device is exclusively dedicated to P1 (and possibly bears a visual sign indicating this to the user), or the identification device can be associated with a number of different peripherals, but comprises means to allow the user to select one of these peripherals before entering the information identifying the user and/or his terminal. The identification device will then send to the server, along with said information identifying the user and/or his terminal, an information identifying the selected peripheral.

After steps 221 to 223, step 24 (described further in this text) shall be executed.

Description of a Second Embodiment

If now the user chooses in 21 the second mode for selecting a peripheral, the sequence 23 of steps 231 to 233 shall be executed.

This second mode can be chosen in particular if the user wants to select a peripheral which is not associated to any identification device (e.g. classical standard printer).

In step 231, the user connects its terminal to the network 1 for establishing a connection between the terminal T and the server S.

This connection can have been already established—it is possible that the terminal has been connected even before initial step 21.

The connection to the server through the network 1 can be replaced by a connection through any network common to the terminal and to the server S. It is thus possible that the network 1 is e.g. a private intranet, and the network used in step 231 is another network, e.g. the internet.

In step 232, once the terminal T has been connected to the server S through a network and a network session has been initiated between T and S, the user sends to the server S:

information identifying the selected peripheral P1, indicating that P1 is the peripheral to which output requests issued from the terminal T must be directed, as well as an information identifying the terminal itself. This information can have been already stored by the server at the initiation of the network session between the terminal and the server.

To perform steps 231 and 232, the user can browse a resource list from a display imported on his terminal screen from the server S to select the desired peripheral.

Such a list can be logically organized and visually presented to the user, in different ways.

A possible solution for this would be to have the display of the different peripherals which can be selected by the user be organized as a "geographical" representation of the actual spatial distribution of the peripherals across the network.

In this case, the display of the list would represent the different buildings covered by the network 1, and prompt the user for selecting one of these buildings.

Then the display could show the user a representation of the chosen building with its different areas, floors, etc . . . And here again, the user would be prompted to choose one of these.

Finally, the display could show the different rooms available within the chosen area/floor, and indicate which peripherals can be selected within these rooms. The user would be prompted again for choosing a peripheral.

For avoiding any ambiguity on the peripheral to be selected, the display could even show an image (e.g. a picture) of the selected peripheral, said picture representing the peripheral in its real physical environment (in the room).

This would constitute a very ergonomic and natural interface means for guiding the user in order to help him select the right peripheral next to him, or anywhere in the network (the user might want to select e.g. his own printer located in his office, while he is away from his office).

And the number of successive displays offering "zooms" at different levels of detail, on different parts of the network, can be adapted.

Other types of representation of the peripherals of the network can of course be used.

In step 233, the server S updates the second table of its memory, as in step 223 described in reference to the first mode. Steps 223 and 233 are thus equivalent.

Step 24 globally represents the redirecting of the output requests issued by the terminal T to the selected peripheral P1.

For the execution of this step, the terminal of the user must be connected to the network 1.

Such connection to the network 1 can have been established from the beginning of the process, before the choice of a selection mode by the user. In some cases, we have seen that the terminal had to be connected to the server through a network—and possibly through the network 1—in order that the server receives the information identifying the selected peripheral for the terminal T.

In any case, if the terminal is not connected to the network 1 yet (in particular in the first embodiment described above), such connection must be established before step 24.

An "output request" as generated by the terminal basically comprises:
an information identifying the emitter of the request (i.e. the terminal in the present case),
information defining the data to be edited on a peripheral (i.e. data content and arrangement, in the form e.g. of a data file),
as well as parameters concerning the graphical edition (printing or other) to be performed.

At this stage, the server has memorized an information that associates the terminal T with the peripheral P1.

And as said before, S is the declared peripheral in the terminal: all output requests generated by the terminal should then in the first place be directed to the server S.

Step 25 can be executed in different ways, to redirect such requests to the selected peripheral P1.

Redirecting of Output Requests

Step 24 is executed either after steps 221 to 223 or after steps 231 to 233.

A first way to execute step 24 is to have the server S simply receiving the output requests coming from the terminal T and then rerouting them to the selected peripheral P1.

To do this, the server S uses the second table of its memory means. When receiving an output request from the network 1, the server S scans said second table to determine which peripheral is associated with the terminal having generated the output request (the server S receives in the output request an information identifying the terminal T).

Once this peripheral is determined, the server knows the network address of this selected peripheral (said network address being preferably used in the second table to identify the peripheral, and being in any case memorized in association with the information identifying the peripheral if this identifying information is a different one).

The network address can be e.g. a IP address, an U.R.L. or a e-mail address.

Then, the server can reroute the output request received from the terminal T to the selected peripheral P1.

The above implies that an application software for managing graphical output requests is implemented on the server S.

It is specified that the "server" S is a server in the broad meaning.

The server S can be any device having a network address in the network 1. It can be for example a state of the art printer as mentioned above, and in this case it does not need any additional software for managing graphical output requests.

It can also be another type of device such as a personal computer—in this case a specific piece of software for managing the output requests must be implemented on the server S.

According to this first way of executing step 24, the output request (including the content of the data to be edited) is received by the server S, and then rerouted by the server to the selected peripheral P1.

Such rerouting of the output requests allows the user to have any peripheral of the network execute an output request, while:
the only one and same item is declared in the terminal as being the recipient of the output requests (the "print queue" in the terminal contains only the server S), and
no special configuration of the terminal is required—no installation of any plug-in or hardware connection: the terminal can be of any standard type (e.g. a standard laptop computer).

According to a second way to execute step 24, the user's terminal T does not allow the direct sending of a full output request to the server S when the user enters on his terminal a command to output data on the selected peripheral.

Instead, when the user enters such a command the following occurs:
a plug-in which has been installed on the terminal builds a message to be sent to the server through the network 1, said message:
containing an information identifying the terminal T, and
requesting a network address for sending to such an address the actual and full output request (including the data to be edited). But the actual output request is not sent to the server S,
the plug-in sends this message to the server through the network 1,
when receiving this message from the terminal T, the server S scans the second table in its memory means, to determine which peripheral is associated to the terminal T. It is recalled that a preferred information for identifying the selected peripheral in the second table is the network address of the peripheral, and that if another type of identifying information is used to identify the selected peripheral, the server S nevertheless knows the network address of all peripherals, and is thus able to send back to the terminal T the network address of the peripheral associated to the terminal,
the plug-in then receives from the server—always through the network 1—the network address of the selected peripheral,
the plug-in builds a full output request directed to the network address received from the server S—i.e. to the selected peripheral P1 and sends it to this address.

Thus, the request will be executed by the selected peripheral P1.

This second way to execute step 24 corresponds to a "peer to peer" approach. It avoids unnecessary loading of the network 1 with the transfer of full output requests, including the data to be edited. It is thus advantageous especially for the redirecting of requests concerning large data files.

According to a third way to execute step 24, another type of plug-in is implemented in the user's terminal. This plug-in does not allow the direct sending of a complete output request to the server S when the user enters on his terminal a command to output data on the selected peripheral, as in the second way described above.

Instead, the following occurs:

the plug-in builds a message to be sent to the server through the network 1, said message containing an information identifying the terminal T and all information necessary to build the full output request (including the data to be edited). This message is built by the plug-in as an e-mail, the plug-in sends this e-mail to the server S, through the network 1, the server, when receiving the e-mail, extracts from the e-mail the information identifying the terminal T the server S then scans the second table in its memory means, as in the second way of executing step 24 described above. The server S thus identifies the network address of the selected peripheral P1, the server S then builds another e-mail, directed to P1, and containing all information for executing the output request, (including all necessary data)

the selected peripheral has means to extract the request when receiving the email from the server, extracts it and executes it.

This third way of executing step 24 is specially well adapted when the server S is distant from the terminal and/or from the selected peripheral, and when there is between them a network firewall preventing the server to receive full output requests.

It can be implemented using classical protocols for transferring e-mails, such as SMTP (Simple Mail Transfer Protocol), with e.g. POP3 servers.

In this third way, the output request is "hidden" from the firewall within the exchanged e-mails and is thus not stopped by the network firewall on its way to the server, all data necessary to build the full output request and to perform the graphical edition of the data being included in these e-mails.

All the embodiments can also comprise a step of encryption of the data or the identifying information. The relevant pieces of software or plug-ins are thus implemented in the Server S and/or terminal T.

In its different embodiments, the invention allows a user to select any peripheral of a network for performing a graphical edition of data.

The invention provides a flexible and powerful solution for using various resources of a network.

And as seen above, it can be implemented with no, or minimum, software adaptation of standard terminals (e.g. laptops) and printers (see the second mode described above).

What is claimed is:

1. A method for enabling a user to select and use a peripheral connected to a network upon which a server operates for the purpose of having the selected peripheral execute data output requests emitted by a terminal of the user connected to the network, the peripheral being selected by the user from a plurality of peripherals connected to the same network, wherein said terminal of the user is permanently configured to the parameters of the server, so as to direct in a first instance the output requests, generated by the terminal, to the server, the user sends to the server information identifying the selected peripheral, together with information identifying the user and/or the terminal of the user, the server updates a table of a memory associated with the server, to associate the terminal of the user with the selected peripheral, so that subsequent output requests generated by the terminal of the user shall be directed by the server to die selected peripheral.

2. A method according to claim 1, wherein the user indicates, to the server, the selected peripheral through an identification device associated with the peripheral.

3. A method according to claim 2, wherein the identification device is selectively associated with the peripheral.

4. A method according to claim 2, wherein:

the user provides die selected peripheral with identification information relative to the user and/or to the terminal, by a direct input on the identification device associated to the peripheral;

the device transmits to the server the identification information, together with an information identifying the selected peripheral;

the server updates said table of a memory associated with the server associating each terminal which is known by the server to one of the peripherals of the network, for the purpose of redirecting output requests from a given terminal to the associated peripheral.

5. A method according to claim 4, wherein the update of the table associated with server comprises the step of updating the association of the given terminal to associate the terminal with the selected peripheral.

6. A method according to claim 2, wherein the identification device comprises a keypad for allowing the user to enter one or more identification code(s).

7. A method according to claim 2, wherein the identification device comprises a sensor able to sense biometric information specific to the user.

8. A method according to claim 2, wherein the identification device comprises a card reader for reading the identification information contained in a card personal to the user.

9. A method according to claim 2, wherein the identification device comprises an infrared receiver for receiving identification information which have been beamed by the user from a device personal to the user and having an infrared port.

10. A method according to claim 2, wherein the identification device allows identification of the user.

11. A method according to claim 10, wherein the server receives the information identifying the user, the server scans a reference table of its memory means to check that the received information corresponds to a declared user, the server scans the first table of its memory means to determine which is the terminal associated with the identified user, and retrieves from this first table information identifying the terminal, the server updates the second table of its memory means, associating in the second table the information identifying the terminal with the peripheral.

12. A method according to claim 10, wherein the terminal sends information identifying the selected peripheral, indicating that said peripheral is the peripheral to which output requests issued from the terminal must be directed, the terminal sends as well an information identifying the terminal itself.

13. A method according to claim 12, wherein a resource list is provided which a user can browse via a display imported on his terminal screen from the server, to select the desired peripheral.

14. A method according to claim 13, wherein the list of peripherals is organized as a geographical representation of a spatial distribution of the peripherals across the network.

15. A method according to claim 13, wherein the list of peripherals is organized to show different rooms available within a chosen area and/or floor, and wherein the list of peripherals indicates which peripherals can be selected within the different rooms.

16. A method according to claim 15, wherein the display shows an image of the peripheral in its physical environment.

17. A method according to claim 12, wherein the server receives the information identifying the user, the server scans a reference table of its memory means to check that the received information corresponds to a declared user, the server scans the first table of its memory means to determine the terminal associated with the identified user, and retrieves from the first table information identifying the terminal, the server updates the second table of its memory means, associating in the second table the information identifying the terminal with the peripheral.

18. A method according to claim 2, wherein the identification device allows identification of the terminal.

19. A method according to claim 18, wherein the server receives the information identifying the user, the server scans a reference table of its memory means to check that the received information corresponds to a declared user, the server updates the second table of its memory means, associating in this second table the information identifying the terminal with the peripheral.

20. A method according to claim 1, wherein the user indicates to the server the selected peripheral on a display of the terminal of the user, a network connection being established between the terminal and the server.

21. A method according so claim 1, wherein the information identifying the peripheral can be the network address of the peripheral.

22. A method according to claim 1, wherein memory means of the server comprises two tables, the two tables including a first table listing set of users and all terminals associated with the users, and a second table listing all associations of the terminals or users with selected peripherals.

23. A method according to claim 22, wherein the two tables are gathered in a single table.

24. A method according to claim 1, wherein the server is comprised in a printer.

25. A system for enabling a user to select and use a peripheral connected to a network upon which a server operates for the purpose of having the selected peripheral execute data output requests emitted by a terminal of the user connected to the network, the peripheral being selected by the user from a plurality of peripherals connected to the same network, the system comprising:

a terminal of the user permanently configured to the parameters of the server, so as to direct in a first instance the output requests, generated by the terminal, to the server, wherein the terminal, under direction from the user, sends to the server information identifying the selected peripheral, together with information identifying the user and/or the terminal of the user, and wherein the server comprises executable instructions for updating a table of a memory associated with the server, to associate the terminal of the user with the selected peripheral, so that subsequent output requests generated by the terminal of the user shall be directed by the server to the selected peripheral.

26. A system according to claim 25, wherein the user indicates, to the server, the selected peripheral through an identification device associated with the peripheral.

27. A system according to claim 26, further comprising an interface on the terminal wherein the user provides the selected peripheral with identification information, relative to the user and/or to the terminal, by a direct input on the identification device associated to the peripheral; wherein the device transmits to the server the identification information, together with an information identifying the selected peripheral; and wherein the server updates said table of a memory associated with the server associating each terminal which is known by the server to one of the peripherals of the network, for the purpose of redirecting output requests from a given terminal to the associated peripheral.

28. A system according to claim 27, wherein the update of the table associated with the server comprises the step of updating the association of the given terminal to associate the terminal with the selected peripheral.

29. A system according to claim 25, wherein the user indicates to the server the selected peripheral on a display of the terminal of the user, a network connection being established between the terminal and the server.

30. A system according to claim 25, wherein memory means of the server comprises two tables, and wherein the two tables comprise: a first table for listing a set of users and all terminals associated with the users, and a second table for listing all associations of the terminals or users with selected peripherals.

31. A method for enabling a user to select and use a peripheral connected to a network upon which a server operates for the purpose of having the selected peripheral execute data output requests emitted by a terminal of the user connected to the network, the peripheral being selected by the user from a plurality of peripherals connected to the network, the selection updating a table comprised in memory means of the server, the table containing the associations of the terminal and the peripherals wherein when receiving an output request from the network, the server scans said table to determine the peripheral associated with the terminal having generated the output request, the server thereafter rerouting the output request, received from the terminal, to the selected peripheral.

32. A method according to claim 31, wherein the method comprises a step of encryption of data to be output.

33. A system for facilitating a user selecting and using a peripheral connected to a network upon which a server operates for the purpose of having the selected peripheral execute data output requests emitted by a terminal of the user connected to the network, the peripheral being selected by the user from a plurality of peripherals connected to the network, the selection updating a table comprised in memory means of the server, the table containing the associations of the terminal and the peripherals wherein when receiving an output request from the network, the server scans said table to determine the peripheral associated with the terminal having generated the output request, the server thereafter rerouting the output request, received from the terminal, to the selected peripheral.

34. A method for enabling a user to select and use a peripheral connected to a network upon which a server operates for the purpose of having the selected peripheral execute data output requests emitted by a terminal of the user connected to the network, the peripheral being selected by the user from a plurality of peripherals connected to the network, the selection updating a table comprised in memory means of the server, the table containing the associations of the terminal and the peripherals wherein the user's terminal does not allow the direct sending of a full output request to the server when the user enters on his terminal a command to output data on the selected peripheral.

35. A method according to claim 34, wherein the method comprises a step of encrypting data to be output.

36. A system for facilitating a user selecting and using a peripheral connected to network upon which a server operates for the purpose of having the selected peripheral execute data output requests emitted by a terminal of the user connected to the network, the peripheral being selected by the user from a plurality of peripherals connected to the network, the selection updating a table comprised in memory means of the server, the table containing the associations of the terminal and the peripherals wherein the user's terminal does not allow the direct sending of a full output request to the server when the user enters on his terminal a command to output data on the selected peripheral.

37. A method for enabling a user to select and use a peripheral connected to a network operated by a server for the purpose of having the selected peripheral execute data output requests emitted by a terminal of the user connected to the network, the peripheral being selected by the user from a plurality of peripherals connected to the same network, this the selection updating a table comprised in memory means of the server, this the table containing the associations of the terminal and the peripherals wherein the user's terminal does not allow the direct sending of a full output request to the server when the user enters on his terminal a command to output data on the selected peripheral, wherein when the user enters a command of output, the following steps occur:
a plug-in installed on the terminal builds a message to be sent to the server through the network, said message:
containing information identifying the terminal, and
requesting a network address for sending to the network address the actual and full output request,
the server scans the table in his memory means, to determine which peripheral is associated with the terminal, using the network address of the peripheral as information for identifying the selected peripheral
the server sends back to the terminal the network address of the peripheral associated with the terminal,
the plug-in then receives the network address of the selected peripheral,
the plug-in builds a full output request directed to the network address received from the server and sends it to the network address.

38. A method for enabling a user to select and use a peripheral connected to a network operated by a server for the purpose of having the selected peripheral execute data output requests emitted by a terminal of the user connected to the network, the peripheral being selected by the user from a plurality of peripherals connected to the same network, this the selection updating a table comprised in memory means of the server, this the table containing the associations of the terminal and the peripherals wherein the user's terminal does not allow the direct sending of a full output request to the server when the user enters on his terminal a command to output data on the selected peripheral, wherein when the user enters a command of output, the following steps occur:
a plug-in installed on the terminal builds a message to be sent to the server through the network, said message containing information identifying the terminal and all information necessary to build the full output request, said message being built by the plug-in as an e-mail message,
the plug-in sends the e-mail message to the server through the network,
the server, after receiving the e-mail message, extracts from the e-mail message the information identifying the terminal,
the server, after extracting the information identifying the terminal, scans the table in its memory means, to determine which peripheral is associated with the terminal, using the network address of the peripheral to identify the selected peripheral,
the server, after determining which peripheral is associated with the terminal, builds another e-mail message, directed to the peripheral, containing all information for executing the output request, the selected peripheral having means to extract the request when receiving the e-mail message from the server, extracting it and executing it.

39. A method according to claim 38, wherein the peripheral and/or the server and/or the terminal have means to operate classical protocols for transferring e-mails, such as SMTP (Simple Mail Transfer Protocol).

* * * * *

UNITED STATES PATENT AND TRADEMARK OFFICE
CERTIFICATE OF CORRECTION

PATENT NO. : 6,889,252 B2
DATED : May 3, 2005
INVENTOR(S) : Lacome D'Estalenx

It is certified that error appears in the above-identified patent and that said Letters Patent is hereby corrected as shown below:

Column 3,
Line 64, "www.hp.ccm" should read -- www.hp.com --.

Column 10,
Line 2, "to die" should read -- to the --.
Line 10, "die selected" should read -- the selected --.

Column 11,
Line 36, "according so" should read -- according to --.
Line 41, "listing set" should read -- listing a set --.

Column 13,
Line 13, "to network" should read -- to a network --.

Signed and Sealed this

Twenty-seventh Day of December, 2005

JON W. DUDAS
*Director of the United States Patent and Trademark Office*